Figure 1:
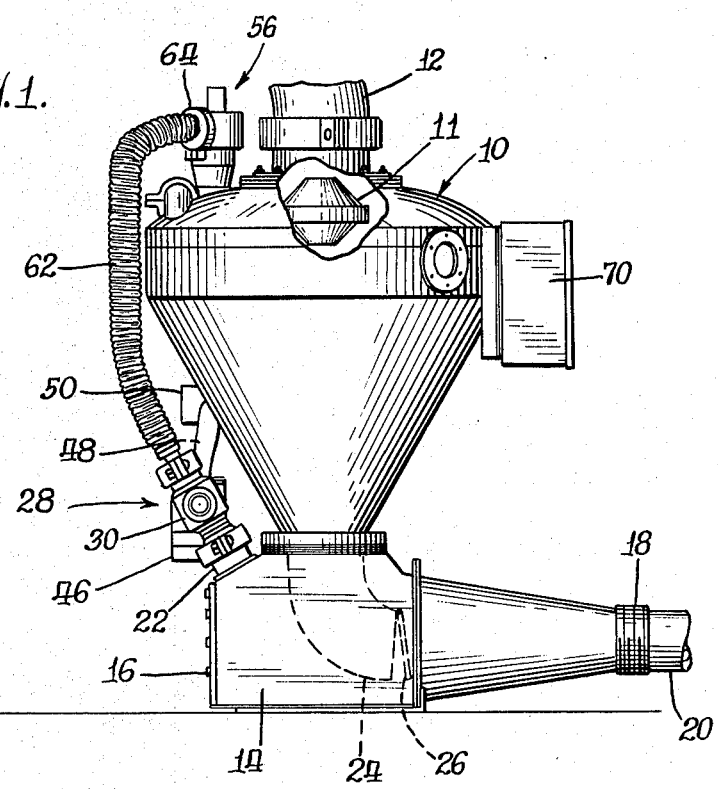

United States Patent [19]

Jacobson

[11] 4,278,367
[45] Jul. 14, 1981

[54] FEEDER APPARATUS FOR PNEUMATIC CONVEYING LINES

[75] Inventor: Wayne M. Jacobson, York, Nebr.

[73] Assignee: Cyclonaire Corporation, Henderson, Nebr.

[21] Appl. No.: 54,689

[22] Filed: Jul. 5, 1979

[51] Int. Cl.³ .............................................. B65G 53/40
[52] U.S. Cl. .................................... 406/109; 406/146
[58] Field of Search .................. 406/25, 32, 109, 126, 406/131, 144, 146

[56] References Cited

U.S. PATENT DOCUMENTS

| 2,608,446 | 8/1952 | La Pota | 406/144 |
| 3,372,958 | 3/1968 | Black | 406/109 X |
| 3,861,830 | 1/1975 | Johnson | 406/131 X |

FOREIGN PATENT DOCUMENTS 2628236 12/1977 Fed. Rep. of Germany ........... 406/144

Primary Examiner—Jeffrey V. Nase
Attorney, Agent, or Firm—Fitch, Even, Tabin, Flannery & Welsh

[57] ABSTRACT

An improved automatic feeder apparatus is described for cyclically receiving dry particulate or powdered material from a source and feeding the same into a conveying line under fluid pressure. The feeder apparatus comprises a transfer vessel having a material inlet for receiving materials from the source and a material outlet coupled into an outlet chamber where the materials are fluidized and fed into the conveying line. Pressure generating means including appropriate valving are provided for continuously supplying a positive air pressure to the chamber for fluidizing the materials, and for alternatively establishing a positive and negative air pressure within the transfer vessel several times a minute to assist in unloading and loading, respectively. The flow of materials into the chamber is controlled by a hinged flap valve which automatically opens and closes in response to changes in pressure within the transfer vessel and chamber. A regulator is provided for regulating the pressure of compressed air in the transfer vessel to a predetermined value below the source pressure and below the maximum pressure in the chamber, which together with the flap valve prevents the lines from clogging.

7 Claims, 3 Drawing Figures

FEEDER APPARATUS FOR PNEUMATIC CONVEYING LINES

The present invention generally relates to the pneumatic conveying of dry particulate or pulverulent material and, more particularly, to an improved automatic feeder apparatus for injecting such product in intermittent increments into a conveying line under fluid pressure. The automatic feeder is a type of conveyor system arranged to operate at a high frequency of dispatch, with low material velocities and relatively low pressures and low volumes of air in relationship to material.

Automatic feeder apparatus are known which are intended for the pneumatic conveying of particulate materials and which comprise a substantially closed, generally conically-shaped transfer vessel with a material inlet at the top and a material outlet at the bottom. The material outlet is coupled to an outlet chamber where the material exiting the transfer vessel is fluidized and guided to a discharge line which leads to the intended location for depositing the fluidized material. Pressure generating means including appropriate valving are provided for continuously supplying a positive air pressure to the chamber for fluidizing the material, and for alternatively establishing a positive and negative air pressure within the interior of the transfer vessel several times a minute for unloading and loading the transfer vessel, respectively. The pressure generating means can contain a venturi assembly which is used to create a suction for assisting in filling the transfer vessel. The flow of material into the outlet chamber is controlled by a hinged flap valve which opens and closes automatically, responsive to the weight of the material and to changes in pressure within the transfer vessel and the chamber. This prior art construction is shown, for example, in U.S. Pat. No. 3,372,958.

For economic reasons, it is desirable to provide an automatic feeder which can operate at high throughput rates for conveying materials of various consistencies, while requiring little or no maintenance. It is also desirable to provide a feeder which is adapted to feed material into the outlet chamber and therefore the conveying line in a controlled manner whereby flow is maximized through the line without experiencing clogging.

Accordingly, it is an object of the present invention to provide an improved automatic feeder apparatus for conveying dry particulate material in intermittent increments to a pneumatic conveying line.

Another object of the present invention is to provide an improved automatic feeder apparatus of the type described which contains means for controlling the feeding of material into a conveying line in a manner wherein flow is maximized without experiencing clogging.

It is still another object of the present invention to provide an improved automatic feeder apparatus of the type described which can operate at high throughput rates and can efficiently accommodate particulate materials of various sizes and consistencies.

Figure 2:
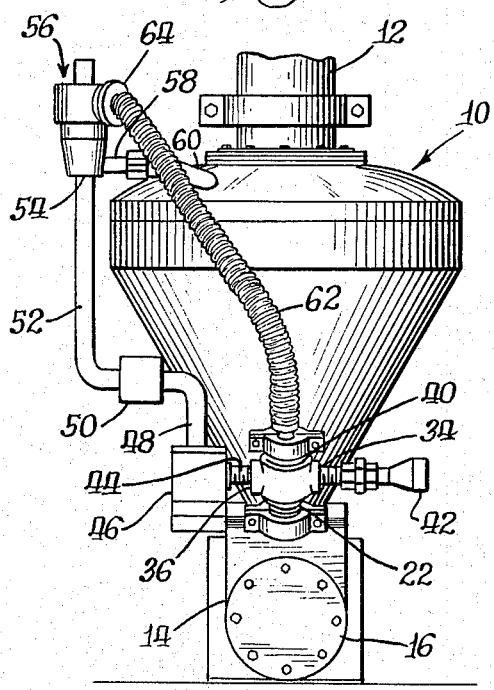
Figure 3:
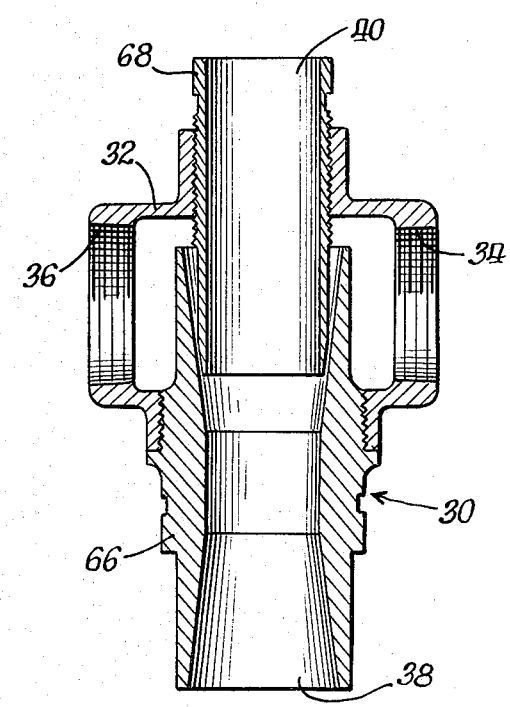

Other objects and advantages of the invention will become apparent from the following description, taken in connection with the accompanying drawings, in which:

FIGS. 1 and 2 are side elevations of the apparatus of the present invention from two angles; and FIG. 3 is an enlarged sectional view showing the construction of a multi-port housing containing a venturi mechanism that is incorporated in the apparatus of the present invention.

This invention is directed to an automatic feeder for receiving dry particulate matter from a source and for feeding the same in intermittent increments into a conveying line under fluid pressure.

Generally, the device of the present invention comprises a substantially closed transfer vessel having a material inlet connected to the source and a material outlet coupled to an outlet chamber that is in turn connected to a conveying line. A negative pressure is generated in the transfer vessel during loading and a first positive pressure is generated in the transfer vessel during unloading for urging the materials through the material outlet into the outlet chamber, and a maximum predetermined second positive fluid pressure is also generated in the outlet chamber which can be greater than the first positive fluid pressure. The difference between these pressures provides distinct operational advantages in terms of controlling the flow of material into the chamber and therefore into the conveying line that optimizes flow without experiencing blocking of the line. While a positively controlled valve is used to control the flow of material into the vessel through the inlet, a valve at the materials outlet of the transfer vessel which permits materials to flow from the transfer vessel into the outlet chamber is operative in response to the material flow and the relative pressures present in the transfer vessel and in the chamber, the outlet valve closing when the pressure in the chamber exceeds the pressure in the transfer vessel coupled with the force exerted by weight of the material itself.

Referring more particularly to the drawings, the device of the present invention comprises a substantially closed, generally conically-shaped transfer vessel 10 having a material inlet at the upper end which is connected to a material inlet conduit 12 for guiding the particulate materials from a source (not shown) into the transfer vessel 10. The flow of material into the transfer vessel 10 from the material inlet is preferably controlled by a cone valve assembly 11 of the type disclosed in drawing number 200-2-0004 contained on page 23 of the Operations Manual of Cyclonaire Corporation, the assignee of the present invention and this Operations Manual is hereby incorporated by reference herein, but may be controlled by other valve means. The cone valve is controlled by signals generated by control circuitry to open during the loading cycle, during which time the pressure in the vessel is reduced to produce a suction force that draws the material into the vessel. When the vessel has been filled to a predetermined level, (or has been filling for a predetermined timed cycle) the negative or reduced pressure is eliminated and the cone valve is closed.

The lower end of the transfer vessel 10 is coupled into an output chamber 14 for fluidizing the material as it exits the transfer vessel 10. The chamber 14 comprises an enlarged generally rectilinear manifold 16 which conically tapers to an outlet 18 which is connected to a conveying line 20 that may extend several hundred feet to an intended location where the particulate material is deposited. A curved elbow 24 serves to form a discharge passage from the lower end of the transfer vessel 10 into the interior of the chamber 14.

The lower end of the elbow 24 is directed towards the outlet 18 and is covered by a hinged flap valve 26 which opens and closes responsive to changes in pressure within the transfer vessel 10 relative to the pressure in the chamber 14 during operation. Pressurized air is supplied through an air line 22 which is connected to the end of the discharge manifold 16 opposite the conveying line 20. The pressure of the air is substantially that of the blower or other source that supplies the air and this pressurized air applied to the chamber supplies the main force for moving the matter through the line 20.

In keeping with the present invention, control means, indicated generally at 28, are provided for continuously supplying the positive air pressure at a value of about 15 psi to the discharge manifold 16 through the air line 22, and for establishing either a positive air pressure of about 8-10 psi or a negative air pressure of about 15 inches of mercury within the interior of the transfer vessel 10. These positive and negative pressures are alternatingly applied to the interior of the vessel several times a minute for unloading and loading the transfer vessel 10. The control means 28 includes a venturi assembly 30 and a multi-port housing 32 having ports 34, 36, 38 and 40. Compressed air is supplied through the port 34 by an air line 42 which is connected to a suitable source of compressed air (not shown) at a pressure of about 15 psi. A positive pressure is supplied to the transfer vessel 10 from the control means 28 via the port 36, conduits, valves and other components that will be described. A positive air pressure is supplied to the manifold 16 from the venturi assembly 30 through the port 38 by the air line 22 and a negative air pressure or suction is applied to the transfer vessel 10 by operation of the venturi assembly 30 through the port 40.

The positive and negative air pressures are applied to the interior of the transfer vessel 10 by the control means 28 through the following air lines and valves. The port 36 of the venturi assembly 30 through which a positive supply of air flows is connected by an air line 44 to a discharge valve 46 which controls the flow of positive pressure air to the transfer vessel 10. The discharge valve 46 is connected by an air line 48 to a pressure restrictor 50 for reducing the pressure of the compressed air flowing to the transfer vessel 10 to a predetermined level that is less than the supply pressure. The restrictor is connected by an air line 52 to a port 54 of a multi-port valve 56. The valve 56 is designed to control the flow of air from port 54 to a port 58 which is connected by a line 60 to the interior of the transfer vessel 10 or to communicate a reduced or negative pressure through a line 62 from the port 40 of the control means 28 to the line 60 via ports 58 and 64. Thus, line 60 is adapted to supply positive or negative pressure to the vessel depending upon the position of the valves 46 and 56.

In keeping with the present invention, the venturi assembly 30 has the ports 38 and 40 of the housing 32 aligned with one another, with the port 38 comprising a tube-like venturi member 66, the interior of which is longitudinally tapered from both ends toward the restricted diameter center and thereby provides a ventri configuration. Another cylindrical member 68 is threadably engaged in the port 40 and it extends axially into the upper inner tapered end portion of the venturi member 66 as shown in FIG. 3. The exterior of the insert portion of the member 68 is of a lesser diameter than the inside diameter of the adjacent portion of the venturi member 66 within which it cooperates, and provides an annular passageway around the member 68, communicating with the interior of the housing 32. To create the vacuum in the vessel 10 and referring to FIG. 3, the venturi member 66 produces a reduced or negative pressure in the port 40 which is communicated to the interior of the vessel through the above-mentioned lines 62 and 60, ports 64 and 58 and valve 56. To produce the reduced pressure in the port 40, the discharge valve 46 is closed so that pressurized air entering through port 34 has only one exit, namely through the annular passageway between members 66 and 68 and the relatively high speed flow downwardly through the interior of the member 66, (see FIG. 3), creates a reduced pressure in the port 40 due to a venturi effect.

To load material into the vessel 10, the suction valve is opened, the discharge valve 46 and the cone valve are closed and valve 56 is actuated to communicate line 62 to line 60, so that a vacuum is created in the transfer vessel 10 by the venturi assembly 30. In this regard, it should also be appreciated that the vessel is empty and flap valve 26 is also closed. As the vacuum increases in the transfer vessel 10, the cone valve is opened, and the suction force causes the material to flow into the transfer vessel 10 through the inlet conduit 12. When the material inside the transfer vessel 10 reaches a desired level, control circuitry in a control panel 70 attached to the side of the transfer vessel 10 switches the apparatus to the unloading cycle.

When switched to the unloading cycle, the control circuitry closes the cone valve to stop flow of the material into the vessel, closes the valve 56 to stop flow of air from the vessel and then opens the discharge valve to provide positive pressurized air in lines 48 and 52, which causes pressurized air to be introduced into the vessel to push the material out through the flap valve 26 into the outlet chamber 16.

While the specific control circuitry that controls the timing and operation of the cone valve, as well as the valves 46 and 56 is not described in detail herein, these valves may be controlled by well known electrical control circuitry, such as that shown in drawing number 201-3-0683 contained on page 5 of the Cyclonaire Operating Manual. It is also noted that the detailed construction of the valve 46 has not been shown but is of the design illustrated in drawing number 200-2-0038 contained on page 21 of the above-mentioned Operating Manual. Similarly, the construction and operation of the valve 56 is not shown in detail but its construction is substantially as shown in drawing number 200-2-0010 contained on page 22 of the above-mentioned Operating Manual. These drawings as well as the entire Operating Manual are specifically incorporated by reference herein.

The flap valve automatically opens and closes responsive to changes in pressure in the transfer vessel 10 and the discharge manifold 16. It is preferably fabricated from a heavy rubber-like material which is hinged to connect it to the elbow 24 and also preferably has a reinforcement means attached to it to make it substantially rigid across the surface area of the opening. The valve can also be fabricated from a structurally rigid material such as steel, aluminum or the like, in which event a rubber or rubber-like resilient seal is preferably provided to insure adequate sealing contact is achieved. The hinge is located such that gravity normally biases the valve closed so that when the vessel is empty and vacuum is being applied during the loading cycle, the flap valve will be closed. However, the flap valve 26 readily opens to allow the material to flow out of the vessel if the pressure in the vessel is increased in the positive direction. It should be appreciated that the forces acting to open the valve are those of the weight of the material itself in the vessel as well as the positive pressure that may be present during the unloading cycle and the forces that counteract the opening are the positive pressure in the chamber 14 together with the relative small biasing force of the valve itself.

It should be appreciated that the air flowing through the venturi member 66 passes through the port 38 and line 22 into the chamber 14 during the loading cycle and effectively forces the materials down the conveying line 20 during the discharge cycle and that the pressure in the chamber 14 is substantially the full pressure of the source i.e., preferably about 15 psi, except when the conveying line 20 is cleared in which event the pressure drops.

In accordance with an important aspect of the present invention, the positive pressure that is applied to the interior of the vessel 10 during the unloading cycle is limited to a value less than the pressure supplied through line 42 from the source and is preferably at a level of about 8 to 10 psi compared with the supply pressure which is preferably about 15 psi. As previously mentioned, the pressure is limited by the action of the flow or pressure restrictor 50 which may be of conventional design, such as Model #11-022-001, manufactured by Norgrim, of Littleton, CO, U.S.A. The use of a lesser maximum pressure in the vessel 10 during the unloading cycle results in many significant advantages in terms of operation of the entire transfer unit, as well as the flow of material through the conveying line 20, which, as previously mentioned, may extend several hundred feet. The reduced maximum pressure in the transfer vessel has the effect of regulating the flow of material into the chamber 16 and therefore the conveying line 20, in a manner which substantially prevents clogging of the line, in addition to other operational advantages.

In this regard, it should be noted that prior art transfer vessels utilize an internal positive pressure that is substantially unrestricted and it therefore at the supply pressure level, so that the pressure in the interior of the vessel is substantially equal to the pressure of the supply at all times during the unloading cycle. Prior art transfer units required some means of regulating the flow of material that was introduced into the chamber 14 and this was done using a mechanical limiting device which extended into the manifold 16 and which was adjustable by turning a handle. The end of the device extended to a location adjacent the flap valve 26 to control the extent that it could be opened. When the prior art transfer unit was placed into operation, the device required adjustment for regulating the flow of material from the flap valve and this would vary depending upon the type and consistency of the material that was being conveyed, as well as the length of the conveying line 20 and other factors. In some instances, it was required for the device to be adjusted so that the flap valve could only open a very small amount to properly regulate the flow of material therethrough. In that event, it was vulnerable to clogging when some large clump of material became lodged in the valve opening. This prevented other material from passing which greatly reduced the efficient operation of the conveying system. Since the material is conveyed in a cyclical manner, i.e., the vessel is alternately loaded and unloaded several cycles per minute, it is desirable that the material immediately begin flowing into the conveying line as soon as the transfer unit is switched to the unloading cycle. Obviously, material enters the line much faster if the flap valve were initially completely opened, but a limiting device of the type described precluded this from occurring.

In accordance with the present invention, the operation is such that when the unit is switched to the loading cycle, the pressure in the chamber 14 will normally be quite low. This is due to the fact that during the completion of the unloading cycle the conveying line is cleared of material so that the back pressure is substantially eliminated before the unit is switched to the loading cycle. The prevailing pressure in the chamber 14 is low during the loading cycle, so that when the transfer unit is switched to the unloading cycle, the application of the 8 to 10 psi pressure to the interior of the vessel will cause the material to rapidly flow through the flap valve into the chamber and be moved down the line. As the line 20 is filled, back pressure builds up, eventually to a level that may approach or exceed the pressure inside the vessel, so that the flow of material through the valve will be decreased if not substantially stopped. As the material moves down the conveying line 20 and the back pressure drops, then the material will again flow through the flap valve into the chamber 14.

In this manner, the flow is carefully modulated to produce efficient operation of the overall pneumatic conveying system in a manner whereby the maximum amount of material is moved through the conveying line without experiencing clogging of the line. The use of the pressure restrictor 50 has another significant advantage in that virtually no adjustment need be made to the apparatus after it is installed in the field because the above-described operation is virtually automatic and independent of the size and type of material that is being conveyed through the system. The virtually automatic modulation of the flow of material into the conveying line virtually eliminates the extremely bothersome and expensive downtime that has been required for clearing clogged lines that may occur in prior art systems.

It should be understood that although certain preferred embodiments of th present invention have been illustrated and described, various modifications, alternatives and equivalents thereof will become apparent to those skilled in th art and, accordingly, the scope of the present invention should be defined only by the appended claims and equivalents thereof.

Various features of the invention are set forth in the following claims.

What is claimed is:

1. A feeder apparatus for cyclically receiving particulate material and for injecting the same into a conveying line under fluid pressure, comprising:
   a substantially closed transfer vessel having a material inlet, a material inlet valve, a material outlet and a pressure and material responsive vessel outlet valve, said pressure and material responsive vessel outlet valve being normally closed and automatically operating in response to the force of fluid pressure and material in said vessel relative to the fluid pressure in an outlet chamber in which said outlet valve is located;
   an outlet chamber adjacent the material outlet for receiving the material, said chamber communicating with the conveying line and having an inlet for receiving positive fluid pressure therein:
   a first valve having a first port operatively connected to the interior of said vessel and second and third ports, said first valve operating between fully opened and fully closed positions and connecting said first port only with said second port when opened and said first port only with said third port when closed;

a single source for providing fluid at a positive first predetermined pressure level;

a housing means having a first port to which said source is operably connected, a venturi throat having a downstream portion operably connected to said outlet chamber inlet, a second port operably connected to the second port of said first valve via a first flow path, a third port operably connected to the third port of said first valve via a second flow path, said second flow path having a second valve and a pressure restricting means therein;

means for controlling said first, second and material inlet valves to cycle between loading and unloading modes, said loading mode having said material inlet valve open, said first valve open and said second valve closed, so that said venturi throat creates a negative fluid pressure in said first path and in said transfer vessel, the unloading mode having said inlet valve closed, said first valve closed and said second valve open so that fluid is provided to said vessel through said second valve, said pressure restricting means and said first valve at a second pressure level that is less than said first pressure level, the positive pressure at said second level urging the materials through the material outlet into the outlet chamber, said first fluid pressure being communicated through said venturi throat to said chamber fluid inlet and providing positive fluid pressure in said outlet chamber that approximates said first pressure level, the difference between said second pressure level and said approximate first pressure level provided in said outlet chamber being effective to modulate the flow of material entering said chamber through said vessel material outlet valve to maximize material flow during unloading while substantially preventing clogging of the conveying line, all of the fluid generated by said source being driven through said transfer vessel and said chamber to said conveying line during unloading of said vessel.

2. The feeder apparatus of claim 1 wherein the second positive fluid pressure level is within the range of about 8 to about 10 psi and the first positive fluid pressure level is about 15 psi.

3. A feeder apparatus as defined in claim 1 wherein said vessel outlet valve is a flap valve that has hinge means at the top thereof.

4. A feeder apparatus as defined in claim 3 wherein said flap valve has said hinge means at the top thereof, said flap valve being oriented so that gravity force normally biases the same towards its closed position.

5. A feeder apparatus for cyclically receiving particulate material and for injecting the same into a conveying line under fluid pressure, during respective loading and unloading modes, comprising:

a substantially closed transfer vessel having a material inlet, a material inlet valve, a material outlet and a pressure and material responsive vessel outlet valve, said pressure and material responsive vessel outlet valve being normally closed and automatically operating in response to the force of fluid pressure and material in said vessel relative to the fluid pressure in an outlet chamber in which said outlet valve is located;

an outlet chamber adjacent the material outlet for receiving the material, said chamber communicating with the conveying line and having an inlet for receiving positive fluid pressure therein;

a first valve having a first port operatively connected to the interior of said vessel and second and third ports, said first valve connecting said first port with said second port when opened and said first port with said third port when closed;

a single source for providing fluid at a positive first predetermined pressure level of about 15 psi;

a housing means having a first port to which said source is operably connected, a venturi assembly including a venturi throat having a downstream portion operably connected to said outlet chamber inlet, a second port operably connected to the second port of said first valve via a first path, a third port operably connected to the third port of said first valve via a second flow path, said second flow path having a second valve and a pressure restricting means therein;

means for controlling said first, second and material inlet valves to cycle between said loading and unloading modes, said loading mode having said material inlet valve open, said first valve open and said second valve closed, so that said venturi throat creates a negative fluid pressure in said first path and in said transfer vessel, the unloading mode having said inlet valve closed, said first valve closed and said second valve open so that fluid is provided to said vessel through said second valve, said pressure restricting means and said first valve at a second pressure level within the range of about 8 to 10 psi, the positive pressure of about 8 to 10 psi urging the materials through the material outlet into the outlet chamber, said first fluid pressure of about 15 psi being communicated through said venturi throat to said chamber fluid inlet and providing positive fluid pressure in said outlet chamber that approximates said 15 psi, the difference between said 8 to 10 psi and said approximate first pressure of about 15 psi provided in said outlet chamber being effective to modulate the flow of material entering said chamber through said vessel material outlet valve to maximize material flow during the unloading while substantially preventing clogging of the conveying line.

6. A feeder apparatus as defined in claim 5 wherein said vessel outlet valve is a flap valve that has hinge means connecting the same to said vessel.

7. A feeder apparatus as defined in claim 6 wherein said flap valve has said hinging means at the top thereof, said flap valve being oriented so that gravity force normally biases the same towards its closed position.

* * * * *

UNITED STATES PATENT AND TRADEMARK OFFICE
CERTIFICATE OF CORRECTION

PATENT NO. : 4,278,367
DATED : July 14, 1981
INVENTOR(S) : Wayne M. Jacobson

It is certified that error appears in the above—identified patent and that said Letters Patent is hereby corrected as shown below:

Column 5, line 40, change "it" to --is--.

Column 6, line 41, change "th" to --the--.

Column 6, line 44, change "th" to --the--.

Column 8, line 23, after "first", second occurrence, insert --flow--.

Column 8, line 53, after "during" delete "the".

Signed and Sealed this

Twenty-seventh Day of October 1981

[SEAL]

Attest:

GERALD J. MOSSINGHOFF

*Attesting Officer*    *Commissioner of Patents and Trademarks*